United States Patent
Jones et al.

(10) Patent No.: US 7,492,275 B2
(45) Date of Patent: Feb. 17, 2009

(54) APPARATUS AND METHOD TO VISUALLY INDICATE THE STATUS OF A DATA STORAGE DEVICE

(75) Inventors: Carl E. Jones, Tucson, AZ (US); Gregg S. Lucas, Tucson, AZ (US); Andrew E. Seidel, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 884 days.

(21) Appl. No.: 10/993,769

(22) Filed: Nov. 18, 2004

(65) Prior Publication Data

US 2006/0114758 A1    Jun. 1, 2006

(51) Int. Cl.
  *G08B 5/00*   (2006.01)
(52) U.S. Cl. .............. 340/815.4; 340/568.2; 340/506; 340/641; 710/15; 714/E11.185
(58) Field of Classification Search .......... 340/815.4, 340/500, 568.2, 506, 815.42, 641, 691.1, 340/825.36, 825.49, 331, 332, 635; 710/15; 714/E11.185
See application file for complete search history.

(56) References Cited

U.S. PATENT DOCUMENTS

| | | | | |
|---|---|---|---|---|
| 5,754,112 A | * | 5/1998 | Novak | .............. 340/635 |
| 6,072,280 A | | 6/2000 | Allen | |
| 6,414,662 B1 | | 7/2002 | Havel | |
| 6,590,343 B2 | | 7/2003 | Pederson | |
| 6,608,564 B2 | * | 8/2003 | Post et al. | .............. 340/693.5 |
| 6,731,077 B1 | | 5/2004 | Cheng | |
| 2002/0043943 A1 | | 4/2002 | Menzer et al. | |

OTHER PUBLICATIONS

SFF Committee, "40-pin SCA-2 Connector w/Parallel Selection", SFF-8045, Rev. 4.5, Jul. 23, 2001, pp. 1-27.

* cited by examiner

*Primary Examiner*—Daryl C Pope
(74) *Attorney, Agent, or Firm*—Dale F. Regelman; Quarles & Brady LLP

(57) ABSTRACT

A data storage and retrieval system that comprises a data storage device is disclosed. The data storage and retrieval system further comprises a first LED, a second LED, a third LED, and a fourth LED, interconnected with the data storage device. The data storage device causes the first LED and the second LED to emit first light comprising a first color if the data storage device detects an internal failure. Alternatively, the storage device causes the third LED and the fourth LED to emit second light comprising a second color if the data storage device remains operative.

20 Claims, 16 Drawing Sheets

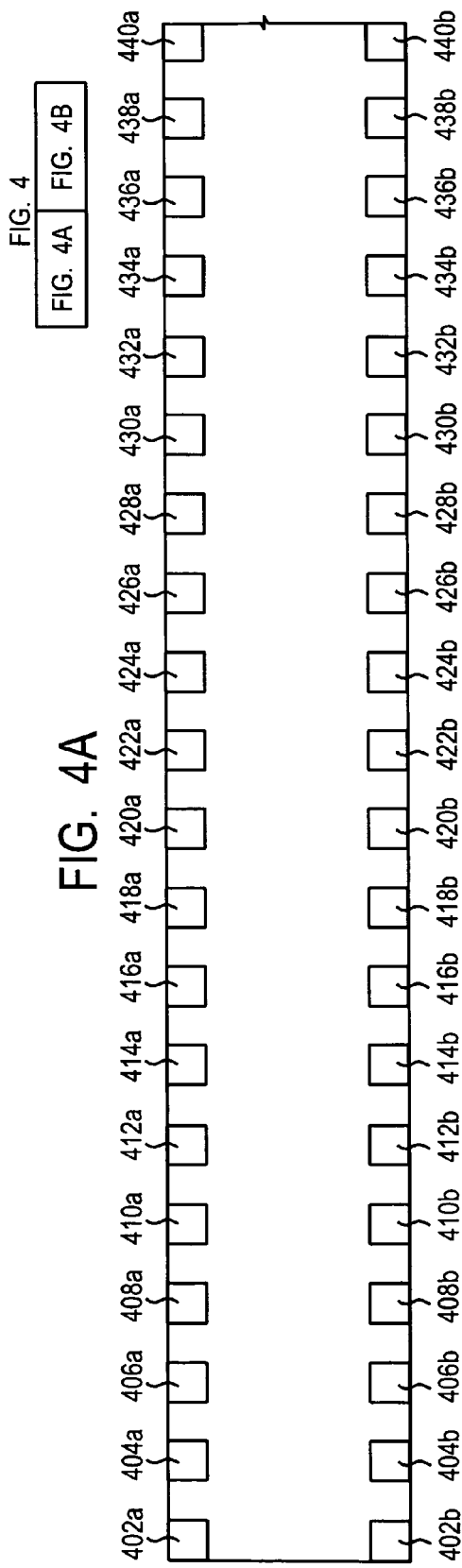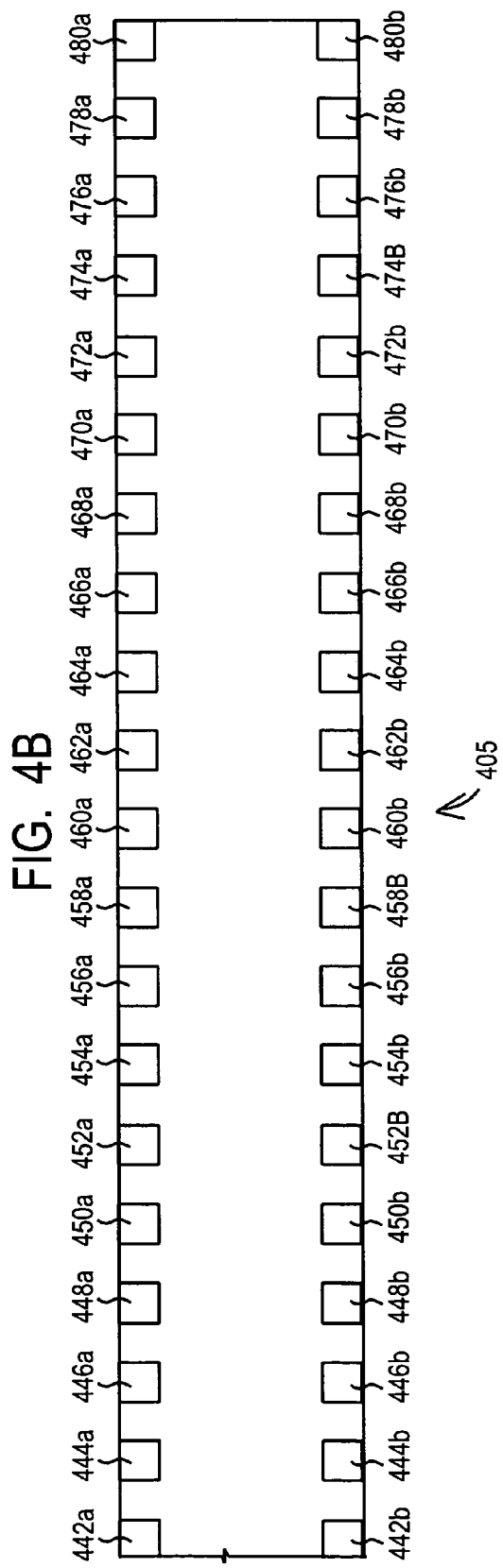

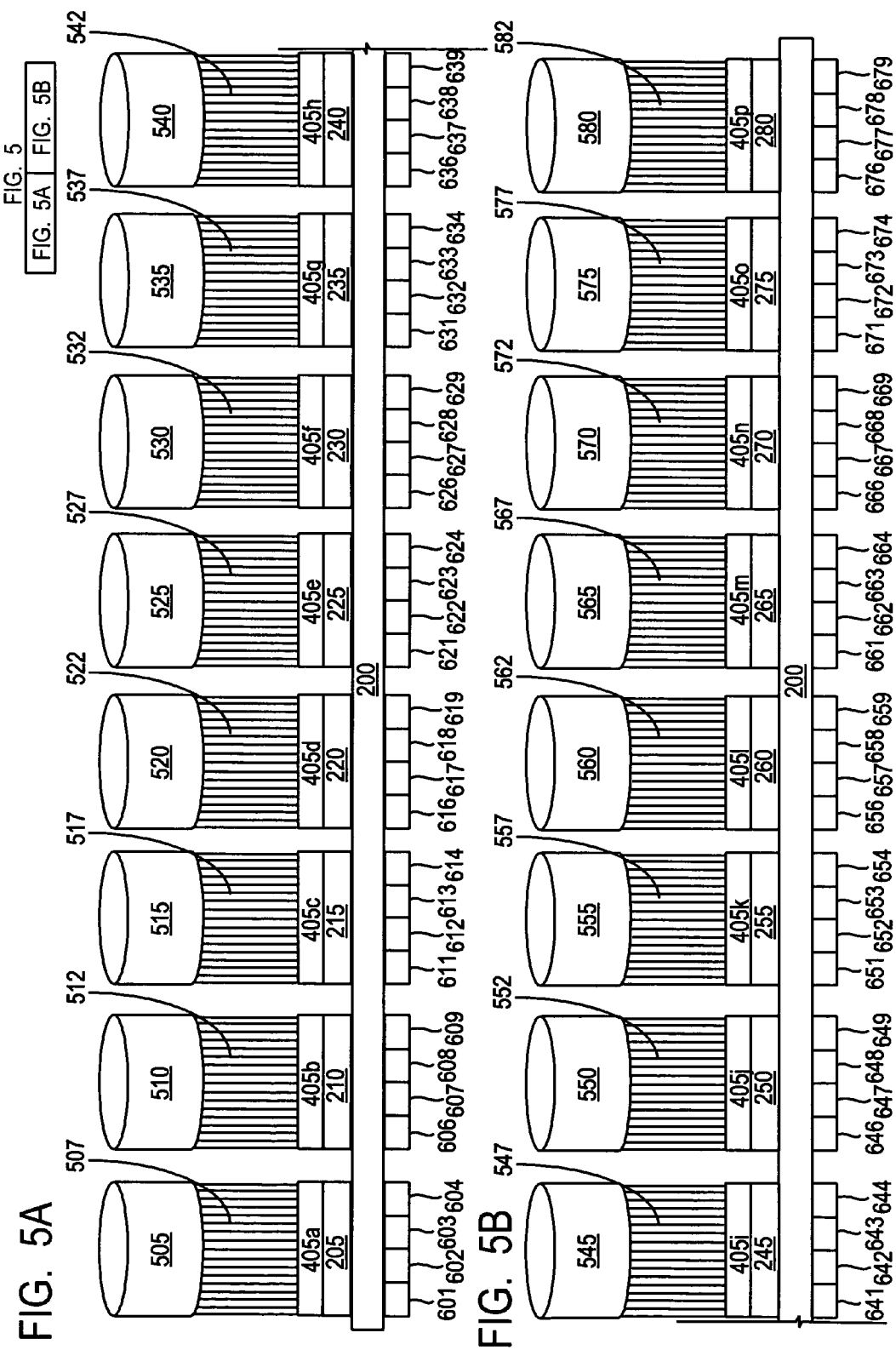

APPARATUS AND METHOD TO VISUALLY INDICATE THE STATUS OF A DATA STORAGE DEVICE

FIELD OF THE INVENTION

This invention relates to an apparatus and method to visually indicate the status of a data storage device.

BACKGROUND OF THE INVENTION

Data storage and retrieval systems are used to store information provided by one or more host computer systems. Such data storage and retrieval systems receive requests to write information to one or more data storage devices, and requests to retrieve information from those one or more data storage devices. Upon receipt of a write request, the system stores information received from a host computer in a data cache. In certain implementations, a copy of that information is also stored in a nonvolatile storage device. Upon receipt of a read request, the system recalls information from the one or more data storage devices and moves that information to the data cache. Thus, the system is continuously moving information to and from a plurality of data storage devices, and to and from the data cache.

Certain standards applicable to the interconnection of the plurality of data storage devices to the data storage and retrieval system require that two LEDs be interconnected with each data storage device, where one LED visually indicates whether the interconnected data storage device is operable, and another LED visually indicates whether the interconnected data storage device is in use. Thus, a data storage and retrieval system comprising (X) data storage devices, and compliant with the Standard comprises (2x) LEDs. The failure of any one of those (2x) LEDs, however, may require that, in order to remain compliant with the standard, one or more data storage devices be taken out of service to repair or replace that failed LED.

What is needed is an apparatus that complies with the interconnection standard, but that does not require that one or more data storage devices be taken out of service in the event a single LED fails.

SUMMARY OF THE INVENTION

Applicants' invention comprises a data storage and retrieval system that comprises a data storage device. The data storage and retrieval system further comprises a first LED interconnected with the data storage device, a second LED is interconnected with the data storage device, and where the first LED and the second LED are capable of emitting first light comprising a first color.

The data storage and retrieval system further comprises a third LED interconnected with the data storage device and a fourth LED interconnected with the data storage device, and where the third LED and the fourth LED are capable of emitting second light comprising a second color.

The data storage device causes the first LED and the second LED to emit the first light if the data storage device detects an internal failure. Alternatively, the storage device causes the third LED and the fourth LED to emit the second light if the data storage device is operative.

BRIEF DESCRIPTION OF THE DRAWINGS

The invention will be better understood from a reading of the following detailed description taken in conjunction with the drawings in which like reference designators are used to designate like elements, and in which:

FIG. 4, which includes FIG. 4A and 4B, is a block diagram showing a second embodiment of Applicants' SCA connector;

FIG. 5, which includes FIG. 5A and FIG. 5B, is a block diagram showing (N) data storage devices interconnected with the backplane of FIG. 1 using (N) SCA connectors and (4N) LEDs disposed on Applicants' backplane;

FIGS. 6B and FIG. 6C, is a block diagram showing (2N) light pipes attached to the (4N) LEDs of FIG. 5;

FIG. 12, which includes

DETAILED DESCRIPTION OF THE PREFERRED EMBODIMENTS

This invention is described in preferred embodiments in the following description with reference to the Figures, in which like numbers represent the same or similar elements. The invention will be described as embodied in an information storage and retrieval system which includes two clusters, a plurality of host adapter ports, a plurality of device adapter ports, and a data cache. The following description of Applicant's apparatus to visually indicate the status of, and the current operation of, one or more data storage devices is not meant, however, to limit Applicant's invention to data processing applications, as the invention herein can be applied to information storage in general.

Figure 1:
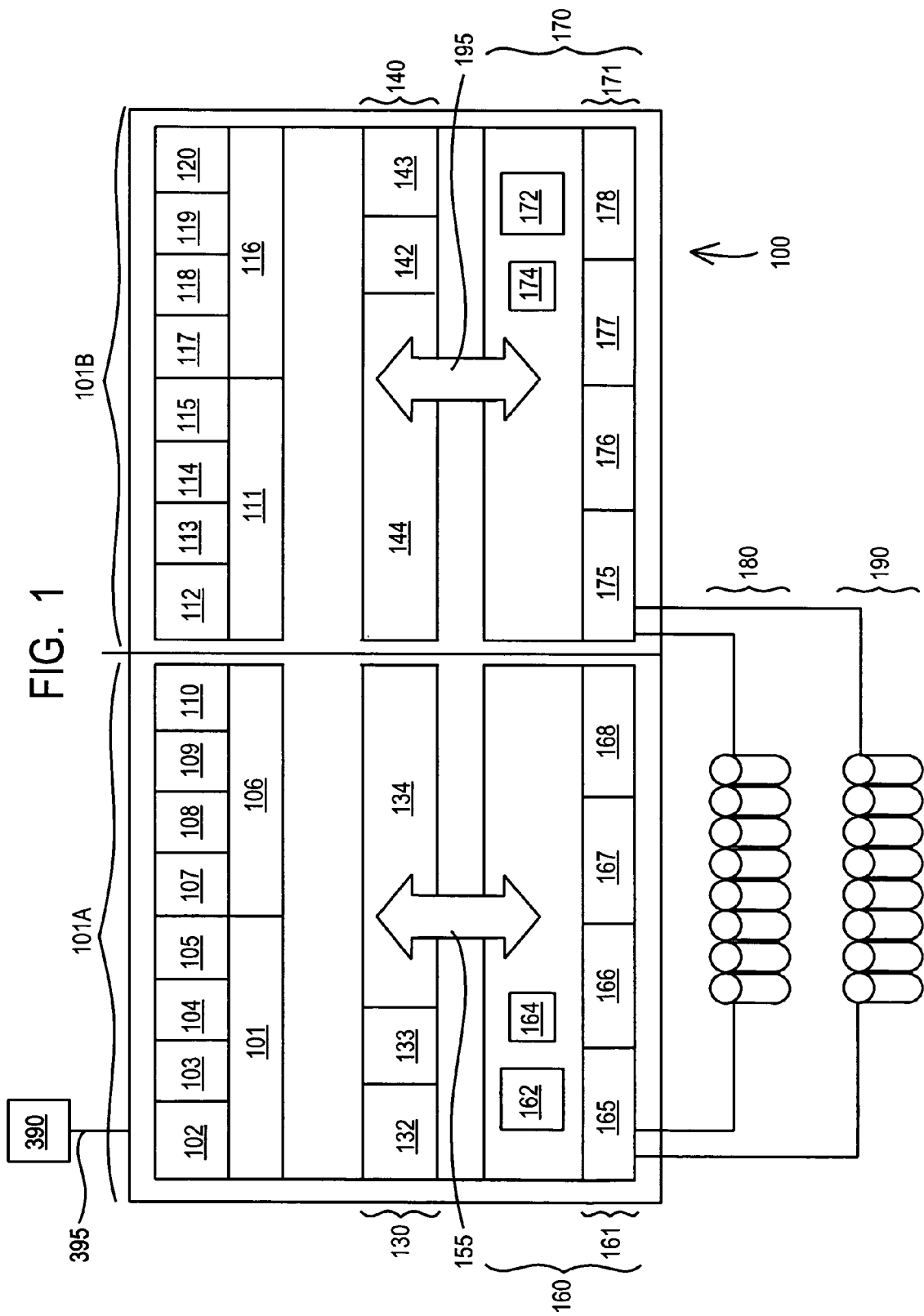
FIG. 1 is a block diagram showing a first embodiment of Applicants' data storage and retrieval system.

Referring now to FIG. 1, information storage and retrieval system 100 is capable of communication with host computer 390 via communication link 395. The illustrated embodiment of FIG. 1 shows a single host computer. In other embodiments, Applicants' information storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 further includes a storage management program. The storage management program in the host computer 390 may include the functionality of storage management type programs known in the art that manage the transfer of data to a data storage and retrieval system, such as the IBM DFSMS implemented in the IBM MVS operating system.

In certain embodiments, Applicants' information storage and retrieval system 100 includes a first plurality of host adapter ports 101A which includes adapter ports 102-105 and 107-110; and a second plurality of host adapter ports 101 B which includes adapter ports 112-115 and 117-120. In other embodiments, Applicants' information storage and retrieval system includes fewer than 16 host adapter ports. In other embodiments, Applicants' information storage and retrieval system comprises more than 16 host adapter ports. Regardless of the number of host adapter ports disposed in any embodiments of Applicants' system, each of those host adapter ports comprises a shared resource that has equal access to both central processing/cache elements 130 and 140.

Each host adapter may comprise one or more Fibre Channel ports, one or more FICON ports, one or more ESCON ports, or one or more SCSI ports. Each host adapter is connected to both clusters through interconnect bus 121 such that each cluster can handle I/O from any host adapter. Internal buses in each subsystem are connected via a Remote I/O bridge 155/195 between the processor portions 130/140 and I/O portions 160/170, respectively.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapter ports 161 which in the illustrated embodiment of FIG. 1 comprises device adapter ports 165, 166, 167, and 168. I/O portion 160 further comprise nonvolatile storage ("NVS") 162 and battery backup 164 for NVS 162.

I/O portion 170 comprises a plurality of device adapter ports 171 which in the illustrated embodiment of FIG. 1 comprises device adapter ports 175, 176, 177, and 178. I/O portion 170 further comprise nonvolatile storage ("NVS") 172 and battery backup 174 for NVS 172.

In certain embodiments of Applicants' system, one or more host adapter ports 101, processor portion 130, and one or more device adapter ports 161, are disposed in a controller disposed in Applicants' information storage and retrieval system. Similarly, in certain embodiments, one or more host adapter ports 111, processor portion 160, and one or more device adapter ports 171, are disposed in a second controller disposed in Applicants' information storage and retrieval system. In these embodiments, Applicants' system 100 includes two controllers interconnected to a plurality of data storage devices.

In the illustrated embodiment of FIG. 1, sixteen data storage devices are organized into two arrays, namely array 180 and array 190. The illustrated embodiment of FIG. 1 shows two storage device arrays. Each storage array appears to a host computer as one or more logical devices.

In certain embodiments, one or more of the data storage devices comprise a plurality of hard disk drive units. In certain embodiments, arrays 180 and 190 utilize a RAID protocol. In certain embodiments, arrays 180 and 190 comprise what is sometimes called a JBOD array, i.e. "Just a Bunch Of Disks," where those arrays are not configured according to RAID. In still other embodiments, arrays 180 and 190 comprise what is sometimes called a SBOD array, i.e. "Switched Bunch Of Disks," where those arrays are not configured according to RAID.

The illustrated embodiment of FIG. 1 shows two storage device arrays. In other embodiments, Applicants' system includes a single storage device array. In yet other embodiments, Applicants' system includes more than two storage device arrays.

In certain embodiments, one or more data storage devices, such as for example plurality of data storage devices 180 and/or plurality of data storage devices 190, are interconnected with Applicants' information storage and retrieval system through a backplane assembly. In certain embodiments, that backplane comprises a plurality of Single Connector Attachment ("SCA") backplane receptacles such that each data storage device is interconnected with the backplane by an SCA connector mated with an SCA backplane receptacle. In certain embodiments, that backplane comprises a plurality of S-ATA backplane receptacles such that each data storage device is interconnected with the backplane by an S-ATA connector mated with an S-ATA backplane receptacle. In certain embodiments, that backplane comprises a plurality of SAS backplane receptacles such that each data storage device is interconnected with the backplane by an SAS connector mated with an SAS backplane receptacle.

Figure 2:
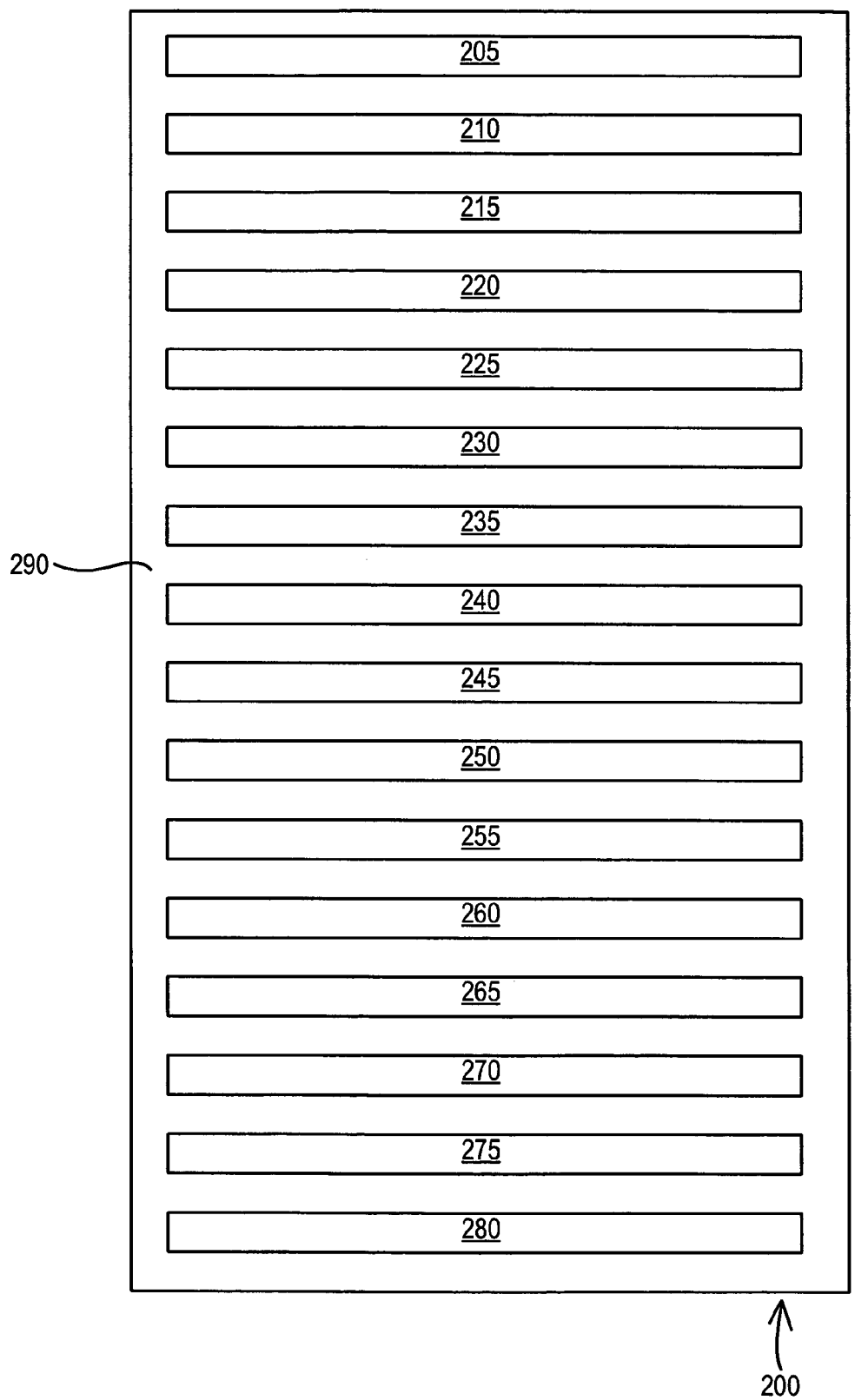
FIG. 2 is a block diagram showing one embodiment of Applicants' backplane comprising a plurality of SCA receptacles, where that backplane is disposed in the system of FIG. 1.

In the illustrated embodiment of FIG. 2, backplane 200 comprises side 290. A plurality of backplane receptacles is disposed on side 290 of backplane 200. The illustrated embodiment of FIG. 2 comprises backplane receptacles 205, 210, 215, 220, 225, 230, 235, 240, 245, 250, 255, 260, 265, 270, 275, and 280. In other embodiments, one or more backplanes disposed in Applicants' information storage and retrieval system, such as system 100, comprises fewer than 16 backplane receptacles. In still other embodiments, one or more backplanes disposed in Applicants' information storage and retrieval system, such as system 100, comprises more than 16 backplane receptacles.

Each data storage device is interconnected to a connector which mates with an a backplane receptacle. In certain embodiments each connector comprises a plurality of individual positions. In the illustrated embodiment of FIG. 3, connector 305 comprises 40 individual positions, namely positions 302, 304, 306, 308, 310, 312, 314, 316, 318, 320, 322, 324, 326, 328, 330, 332, 334, 336,338, 340,342, 344, 346, 348, 350,352, 354, 356, 358, 360, 362, 364, 366, 368, 370, 372, 374, 376, 378, and 380. In the illustrated embodiment of FIG. 4, connector 405 comprises 80 individual positions, namely positions 302*a*/302*b*, 304*a*/304*b*, 306*a*/306*b*, 308*a*/308*b*, 310*a*/310*b*, 312*a*/312*b*, 314*a*/314*b*, 316*a*/316*b*, 318*a*/318*b*, 320*a*/320*b*, 322*a*/322*b*, 324*a*/324*b*, 326*a*/326*b*, 328*a*/328*b*, 330*a*/330*b*, 332*a*/332*b*, 334*a*/334*b*, 336*a*/336*b*, 338*a*/338*b*, 340*a*/340*b*, 342*a*/342*b*, 344*a*/344*b*, 346*a*/346*b*, 348*a*/348*b*, 350*a*/350*b*, 352*a*/352*b*, 354*a*/354*b*, 356*a*/356*b*, 358a/358b, 360a/360b, 362a/362b, 3642/364b, 366a/366b, 368a/368b, 370a/370b, 372a/372b, 374a/374b, 376a/376b, 378a/378b, and 380a/380b.

Figure 3:
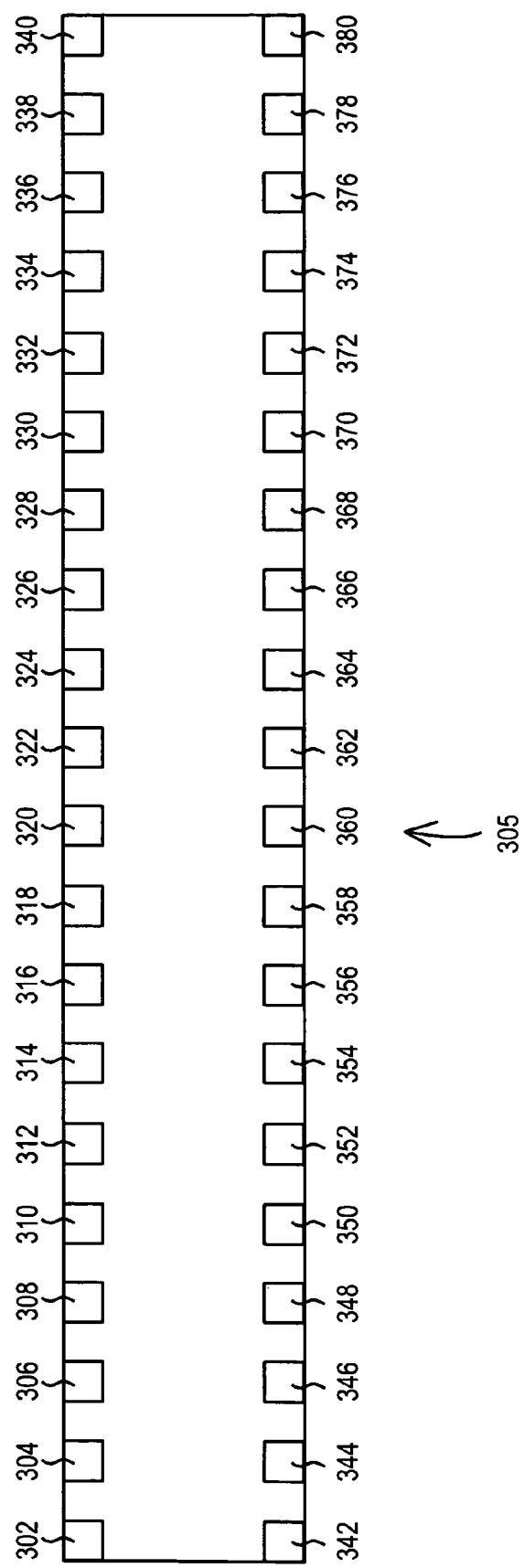
FIG. 3 is a block diagram showing one embodiment of Applicants' SCA connector.

In the illustrated embodiments of FIGS. 3 and 4, connectors 305 and 405 comprises 40-position connectors. In other embodiments, each of the connectors interconnected with a data storage device disposed in Applicants' information storage and retrieval system comprises an 80-position connector.

In certain embodiments, a data storage device is interconnected by an SCA connector to an SCA backplane receptacle disposed Applicants' backplane 200. For example and referring to FIG. 5, which includes FIGS. 5A and 5B, data storage device 505 is interconnected to SCA connector 405a. In the illustrated embodiment of FIG. 5 a plurality of communication links 507 interconnect data storage device 505 and SCA connector 405a. SCA Connector 405a mates with SCA receptacle 205. Similarly, data storage devices 510, 515, 520, 525, 530, 535, 540, 545, 550, 555, 560,565, 570, 575, and 580, are interconnected to SCA connectors 405b, 405c, 405d, 405e, 405f, 405g, 405h, 405i, 405j, 405k, 405l, 405m, 405n, and 405p, respectively. In certain embodiments a plurality of communication links 512, 517, 522, 527, 532, 537, 542, 547, 552, 557, 562, 567, 572, 577, and 482, interconnect data storage devices 510, 515, 520, 525, 530, 535, 540, 545, 550, 555, 560,565, 570, 575, and 580, respectively, and SCA connectors 405b, 405c, 405d, 405e, 405f, 405g, 405h, 405i, 405j, 405k, 405l, 405m, 405n, and 405p, respectively, which mate with SCA receptacles 210, 215, 220, 225, 230, 235, 240, 245, 250, 255, 260,265, 270, 275, and 280, respectively.

In certain embodiments, each data storage device interconnected by an SCA connector to an SCA receptacle disposed on Applicants' backplane comprises a "hot pluggable" device, wherein that data storage device can be disconnected from the backplane while the remaining data storage devices remain operational. For example in certain embodiments, data storage device 505 can be disconnected from backplane 200 without interrupting the operation of the other data storage devices interconnected with backplane 200. In certain embodiments, SCA connector 405a is releaseably connected with SCA receptacle 205 such that connector 405a can be removed from SCA receptacle 205 without disrupting the operation of data storage devices 510, 515, 520, 525, 530, 535, 540, 545, 550, 555, 560,565, 570, 575, and 580.

The SFF-8045 Specification (the "Specification") is directed to use of 40-pin SCA-2 Connectors for use in applications for Fibre Channel disk drives racked in a cabinet. The Specification is hereby incorporated by reference herein. The Specification requires that two LEDs be provided for each data storage device disposed in the system, such as Applicants' information storage and retrieval system 100.

A first LED is denominated a FAULT LED, wherein that LED provides a visual indication in the event: (i) the drive is asserting both of the Enable Bypass signals, (ii) the drive has detected an internal failure, or (iii) the drive has been instructed by a host computer to turn on the FAULT LED. The Specification at Section 6.4.4 requires that such a visual indicated be colored yellow to indicate that it is a warning signal.

A second LED is denominated a READY LED, wherein that LED provides a visual indication regarding the state of readiness and activity of the drive. The Specification at Section 6.4.5 requires that such a visual indicator be colored white or green to indicate that normal activity is being performed. Optionally flashing patterns may be used to signal vendor unique conditions.

Using prior art apparatus and methods, a backplane having (N) interconnected data storage devices comprises (2N) LEDs, such that each data storage device is interconnected with one READY LED and one FAULT LED. Using such prior art apparatus and methods, the failure of any one LED disposed on the backplane causes non-compliance with the Specification. In order to remedy such non-compliance, the entire backplane, and all interconnected data storage devices, may need to be taken out of service to replace the inoperative LED.

Using Applicants' apparatus and methods, a backplane having (N) interconnected data storage devices comprises (4N) LEDs, such that each data storage device is interconnected with two READY LEDs and two FAULT LEDs. Using Applicants' apparatus and method, the failure of any one LED disposed on the backplane does not cause non-compliance with the Specification.

Because Applicants' backplane comprises two FAULT LEDs for each data storage device interconnected to the backplane, that backplane implements an (N+1) redundancy for purposes of Section 6.4.4 of Specification. In such (N+1) redundancy embodiments, the failure of a first FAULT LED interconnected with a data storage device does not trigger a non-compliance event with the Specification because a second FAULT LED interconnected with that data storage device remains operational.

Similarly, because Applicants' backplane comprises two READY LEDs for each data storage device interconnected to the backplane, that backplane implements an (N+1) redundancy for purposes of Section 6.4.4 of Specification. In such (N+1) redundancy embodiments, the failure of a first READY LED interconnected with a data storage device does not trigger a non-compliance event with the Specification because a second READY LED interconnected with that data storage device remains operational.

Referring again to FIG. 5, LEDs 601, 602, 603, and 604, visually indicate the status of data storage device 505. LEDs 601 and 602 are each capable of emitting first light comprising a first color. LEDs 603 and 604 are each capable of emitting second light comprising a second color, wherein the first color differs from the second color. In certain embodiments, the first color is yellow. In these embodiments, LEDs 601 and 602 each comprise a FAULT LED for purposes of Section 6.4.4 of the Specification. In the event LED 601 fails, LED 602 continues to provide the required visual indication under Section 6.4.4. In the event LED 602 fails, LED 601 continues to provide the required visual indication under Section 6.4.4.

In certain embodiments, the second color is selected from the group consisting of white and green. In these embodiments, LEDs 603 and 604 each comprise a READY LED for purposes of Section 6.4.5 the Specification. In the event LED 603 fails, LED 604 continues to provide the required visual indication under Section 6.4.5. In the event LED 604 fails, LED 603 continues to provide the required visual indication under Section 6.4.4.

Similarly, LEDS 606 and 607 are interconnected with data storage device 510, LEDS 611 and 612 are interconnected with data storage device 515, LEDS 616 and 617 are interconnected with data storage device 520, LEDS 621 and 622 are interconnected with data storage device 525, LEDS 626 and 627 are interconnected with data storage device 530, LEDS 631 and 632 are interconnected with data storage device 535, LEDS 636 and 637 are interconnected with data storage device 540, LEDS 641 and 642 are interconnected with data storage device 545, LEDS 646 and 647 are interconnected with data storage device 550, LEDS 651 and 652 are interconnected with data storage device 555, LEDS 656 and 657 are interconnected with data storage device 560, LEDS 661 and 662 are interconnected with data storage device 565, LEDS 666 and 667 are interconnected with data storage device 570, LEDS 671 and 672 are interconnected with data storage device 575, and LEDS 676 and 677 are interconnected with data storage device 580, each comprise a first color.

LEDS 608 and 609 are interconnected with data storage device 510, LEDS 613 and 614 are interconnected with data storage device 515, LEDS 618 and 619 are interconnected with data storage device 520, LEDS 623 and 624 are interconnected with data storage device 525, LEDS 628 and 629 are interconnected with data storage device 530, LEDS 633 and 634 are interconnected with data storage device 535, LEDS 638 and 639 are interconnected with data storage device 540, LEDS 643 and 644 are interconnected with data storage device 545, LEDS 648 and 649 are interconnected with data storage device 550, LEDS 653 and 654 are interconnected with data storage device 555, LEDS 658 and 659 are interconnected with data storage device 560, LEDS 663 and 664 are interconnected with data storage device 565, LEDS 668 and 669 are interconnected with data storage device 570, LEDS 673 and 674 are interconnected with data storage device 575, and LEDS 678 and 679 are interconnected with data storage device 580, each comprise a second color, wherein the second color differs from the first color.

In certain embodiments, the first color is selected from the group consisting of yellow and green. In these embodiments, the second color is selected from the group consisting of yellow and green, wherein the first color differs from the second color. In alternative embodiments, the first color is selected from the group consisting of yellow and white. In these alternative embodiments, the second color is selected from the group consisting of yellow and white, wherein the first color differs from the second color.

Figure 8:
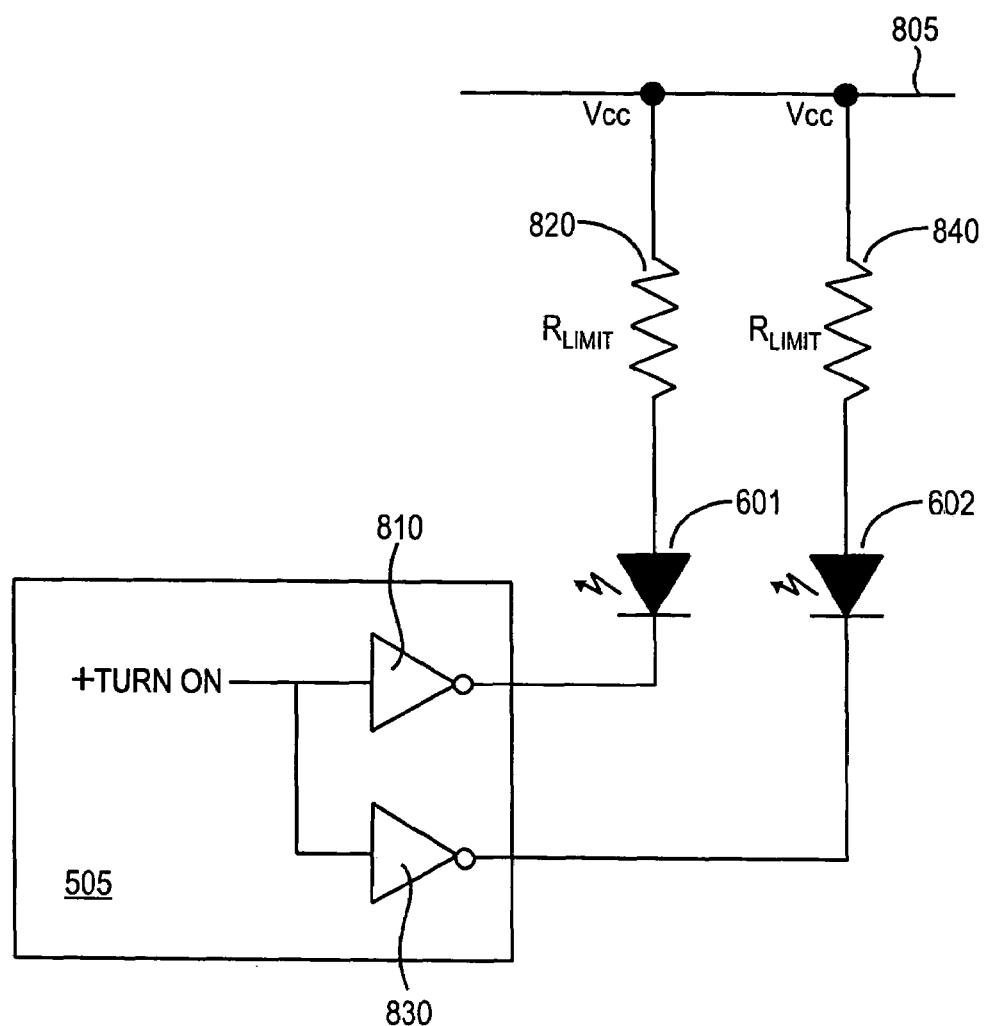
FIG. 8 is a block diagram showing a first embodiment of the electrical interconnections between a data storage device and one pair of LEDs disposed on Applicants' backplane.

Referring now to FIG. 8, in certain embodiments each data storage device, such as data storage device 505, comprises an LED driver for each interconnected LED. In the illustrated embodiment of FIG. 8, data storage device 505 comprises LED driver 810 and LED driver 830. Further in the illustrated embodiment of FIG. 8, the anode of LED 601 is tied to a system power plane 805 through current limiting resistor 820, and the anode of LED 602 is tied to the system power plane 805 through current limiting resistor 840.

If LEDs 601 and 602 emit yellow light, then if data storage device 505 detects, inter alia, an internal failure, data storage device 505 pulls the cathode of LED 601 towards ground using driver 810, causing current to flow through resistor 820 and LED 601 thereby causing LED 601 to emit yellow light, and data storage device 505 pulls the cathode of LED 602 towards ground using driver 830, causing current to flow through resistor 840 and LED 602 thereby causing LED 602 to emit yellow light. In the illustrated embodiment of FIG. 8, in the event one of the LEDs 601 and 602 fails, then if data storage device 505 detects, inter alia, an internal failure, data storage device 505 pulls the cathode of the operable LED towards ground using the LED driver interconnected with the operable LED, causing current to flow through the resistor interconnected with the operable LED thereby causing that operable LED to emit yellow light.

If LEDs 601 and 602 emit white or green light, then if data storage device 505 remains operable, data storage device 505 pulls the cathode of LED 601 towards ground using driver 810, causing current to flow through resistor 820 and LED 601 thereby causing LED 601 to emit either white or green light, and data storage device 505 pulls the cathode of LED 602 towards ground using driver 830, causing current to flow through resistor 840 and LED 602 thereby causing LED 602 to emit either white or green light. In the illustrated embodiment of FIG. 8, in the event one of the LEDs 601 and 602 fails, and if data storage device remains operable, data storage device 505 pulls the cathode of the operable LED towards ground using the interconnected LED driver, causing current to flow through resistor interconnected with the operable LED thereby causing that operable LED to emit either white or green light.

Using the embodiment of FIG. 8, each data storage device interconnected with Applicants' backplane comprises four LED drivers, wherein each of those four LED drivers is interconnected with a different one of 4 LEDs disposed on Applicants' backplane, and wherein each of those 4 LEDs is interconnected with a system power plane via a current limiting resistor.

Figure 9:
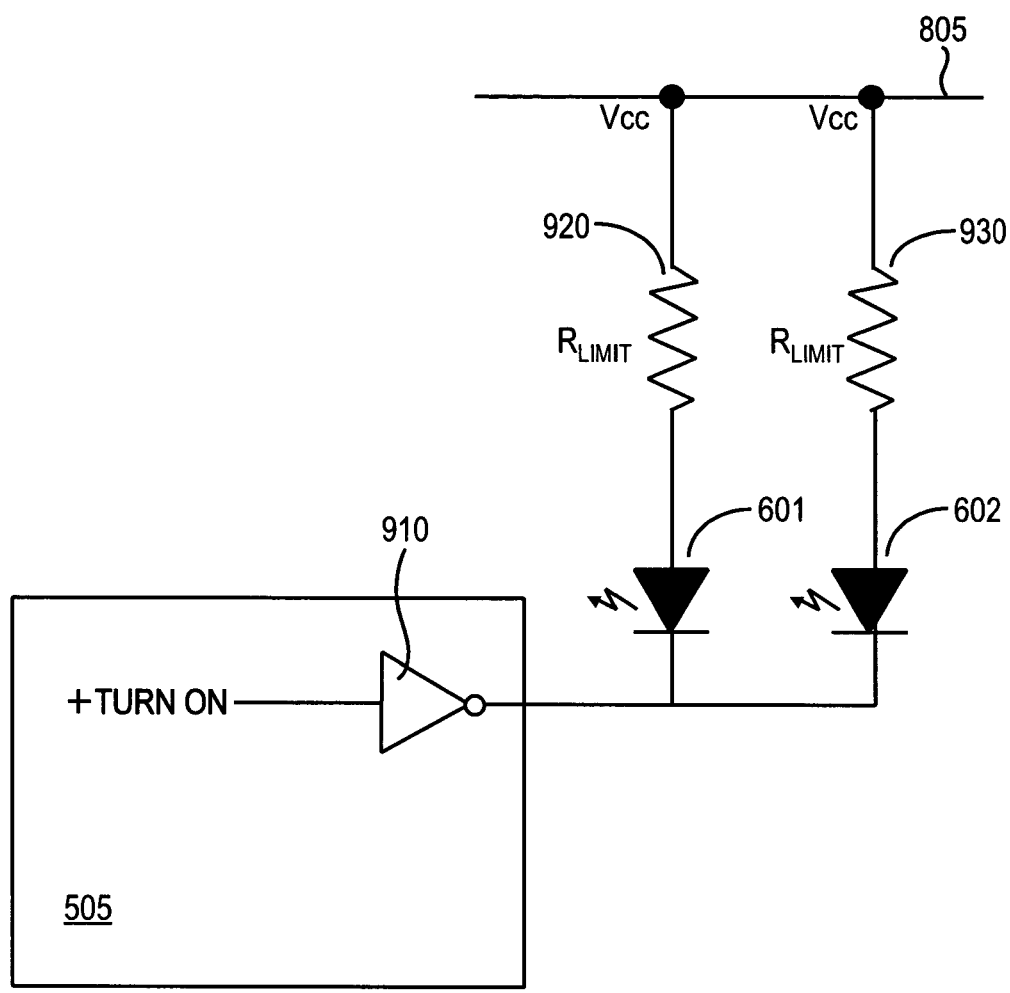
FIG. 9 is a block diagram showing a second embodiment of the electrical interconnections between a data storage device and one pair of LEDs disposed on Applicants' backplane.

Referring now to FIG. 9, in certain embodiments each data storage device, such as data storage device 505, comprises an LED driver for each pair of interconnected LEDs capable of emitting the same colored light. In the illustrated embodiment of FIG. 9, data storage device 505 comprises LED driver 910. Further in the illustrated embodiment of FIG. 9, the anode of LED 601 is tied to system power plane 805 through current limiting resistor 920, and the anode of LED 602 is tied to system power plane 805 through current limiting resistor 930.

In the illustrated embodiment of FIG. 9, if LEDs 601 and 602 emit yellow light, then if data storage device 505 detects, inter alia, an internal failure, data storage device 505 pulls the cathodes of LEDs 601 and 602 towards ground using driver 910, causing current to flow through resistors 920 and 930, and LEDs 601 and 602, thereby causing LEDs 601 and 602 to emit yellow light. In the illustrated embodiment of FIG. 9, in the event one of the LEDs 601 and 602 fails, and if data storage device detects an internal failure, data storage device 505 pulls the cathode of the operable LED towards ground using the LED driver interconnected to both the inoperable and the operable LED, causing current to flow through the resistor interconnected with the operable LED thereby causing that operable LED to emit yellow light.

If LEDs 601 and 602 emit white or green light, then if data storage device 505 remains operable, data storage device 505 pulls the cathodes of LEDs 601 and 602 towards ground using driver 910, causing current to flow through resistors 920 and 930, and LEDs 601 and 602, thereby causing LEDs 601 and 602 to emit either white light or green light. In the illustrated embodiment of FIG. 9, in the event one of the LEDs 601 and 602 fails, and if data storage device remains operable, data storage device 505 pulls the cathode of the operable LED towards ground using the LED driver interconnected to both the inoperable and the operable LED, causing current to flow through the resistor interconnected with the operable LED thereby causing that operable LED to emit white or green light.

Using the embodiment of FIG. 9, each data storage device interconnected with Applicants' backplane comprises two LED drivers, wherein each of those two LED drivers is interconnected with a different pair of 2 LEDs disposed on Applicants' backplane, and wherein each of those 4 LEDs is interconnected with a system power plane via a current limiting resistor.

Figure 10:
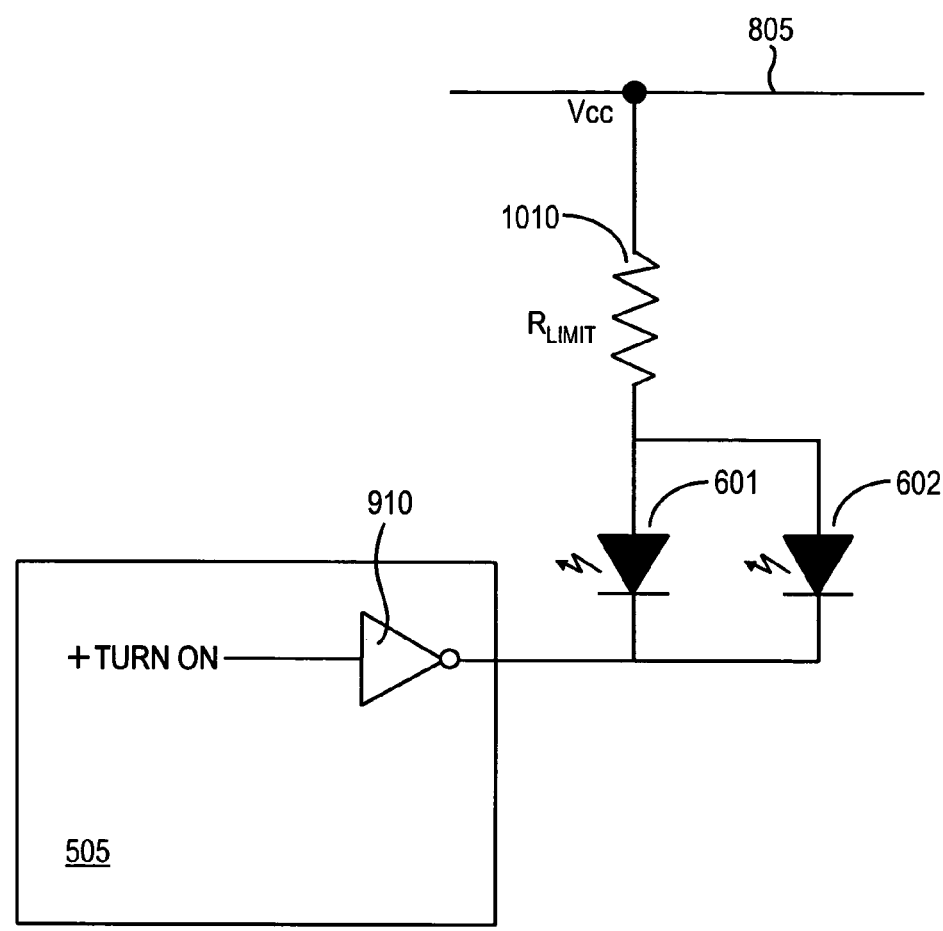
FIG. 10 is a block diagram showing a third embodiment of the electrical interconnections between a data storage device and one pair of LEDs disposed on Applicants' backplane.

Referring now to FIG. 10, in certain embodiments each data storage device, such as data storage device 505, comprises an LED driver for each pair of interconnected LEDs capable of emitting the same colored light. In the illustrated embodiment of FIG. 9, data storage device 505 comprises LED driver 910. Further in the illustrated embodiment of FIG. 8, the anodes of both LEDs 601 and LED 602 are tied to system power plane 805 through current limiting resistor 1010.

In the illustrated embodiment of FIG. 10, if LEDs 601 and 602 emit yellow light, then if data storage device 505 detects, inter alia, an internal failure, data storage device 505 pulls the cathodes of LEDs 601 and 602 towards ground using driver 910, causing current to flow through resistor 1010, and LEDs 601 and 602, thereby causing LEDs 601 and 602 to each emit a first quantum of yellow light. As those skilled in the art will appreciate, the predominant failure mode for an LED comprises an open circuit.

In the illustrated embodiment of FIG. 10, in the event one of the LEDs 601 and 602 fails as an open circuit, and if data storage device detects an internal failure, then data storage device 505 pulls the cathode of the operable LED towards ground using the LED driver interconnected to both the inoperable and the operable LED, causing twice the normal amount of current to flow through the operable LED thereby causing that operable LED to emit a second quantum of yellow light, wherein the second quantum of yellow light is greater than the first quantum of yellow light. As those skilled in the art will appreciate, the amount of light emitted by a light emitting diode is proportional to the forward current. In the illustrated embodiment of FIG. 10, if one of a pair of FAULT LEDs fails, then twice the amount of current flows through the operable FAULT LED causing that operable FAULT LED to emit a greater quantum of yellow light, i.e. the second quantum of yellow light.

If LEDs 601 and 602 emit white or green light, and if data storage device 505 remains operable, data storage device 505 pulls the cathodes of LEDs 601 and 602 towards ground using driver 910, causing current to flow through resistor 1010, and LEDs 601 and 602, thereby causing LEDs 601 and 602 to emit a first quantum of either white light or green light. In the illustrated embodiment of FIG. 10, in the event one of the LEDs 601 and 602 fails, and if data storage device remains operable, data storage device 505 pulls the cathode of the operable LED towards ground using the LED driver interconnected to both the inoperable and the operable LED, causing twice the normal amount of current to flow through the operable LED thereby causing that operable LED to emit a second quantum of white or green light, wherein the second quantum of light is greater than the first quantum of light.

Using the embodiment of FIG. 10, each data storage device interconnected with Applicants' backplane comprises two LED drivers, wherein each of those two LED drivers is interconnected with a different pair of 2 LEDs disposed on Applicants' backplane, and wherein each pair of LEDs is interconnected with a system power plane via one current limiting resistor.

In certain embodiments of Applicants' apparatus, a light pipe transmits the color emitted from each LED pair to a second location disposed in Applicants' information storage and retrieval system. By "light pipe," Applicants mean an assembly comprising a plurality of optical fibers. As those skilled in the art will appreciate, optical fibres comprise strands of transparent material which let light pass through the middle. The outer walls of such optical fibres act like a continual tube of mirror, such that light travels along the fibre bouncing off the mirror-like outer casing until it arrives at the other end of the fibre. In certain embodiments, Applicants' light pipes comprise polymethylmethacrylate. In certain embodiments, Applicants' light pipes comprise polycarbonate.

Figure 6A:
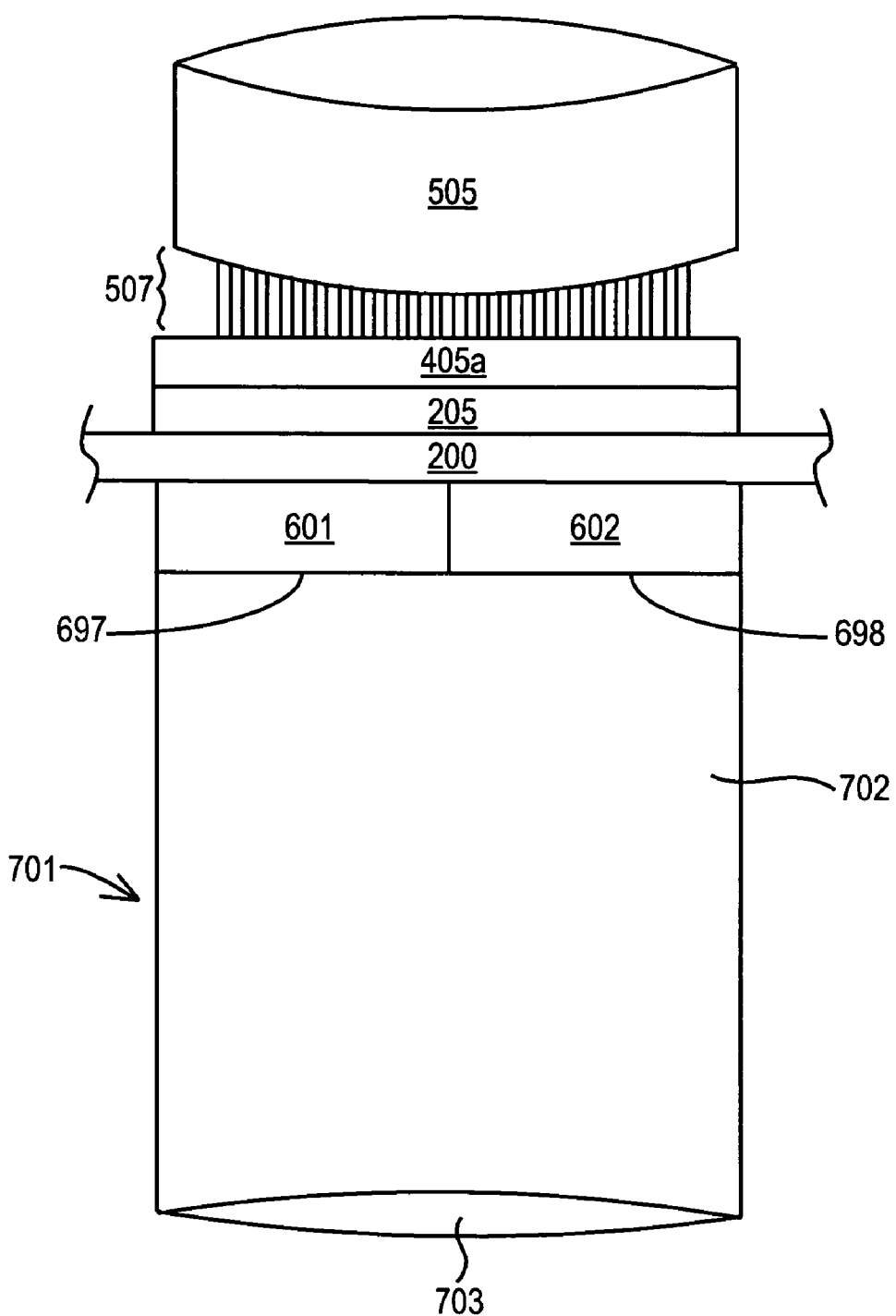
FIG. 6A is a block diagram showing a light pipe attached to the light-emmiting surfaces of two LEDs.

Referring now to FIG. 6A, LED 601 comprises light emitting surface 697, and LED 602 comprises light emitting surface 698. In the illustrated embodiment of FIG. 6A, light pipe 701 comprises first end 702 and second end 703. End 702 is disposed on light emitting surface 697 and light emitting surface 698. The combined light emitted by LEDs 601 and 602 is transmitted through light pipe 701 and visually displayed at end 703.

Figure 6B:
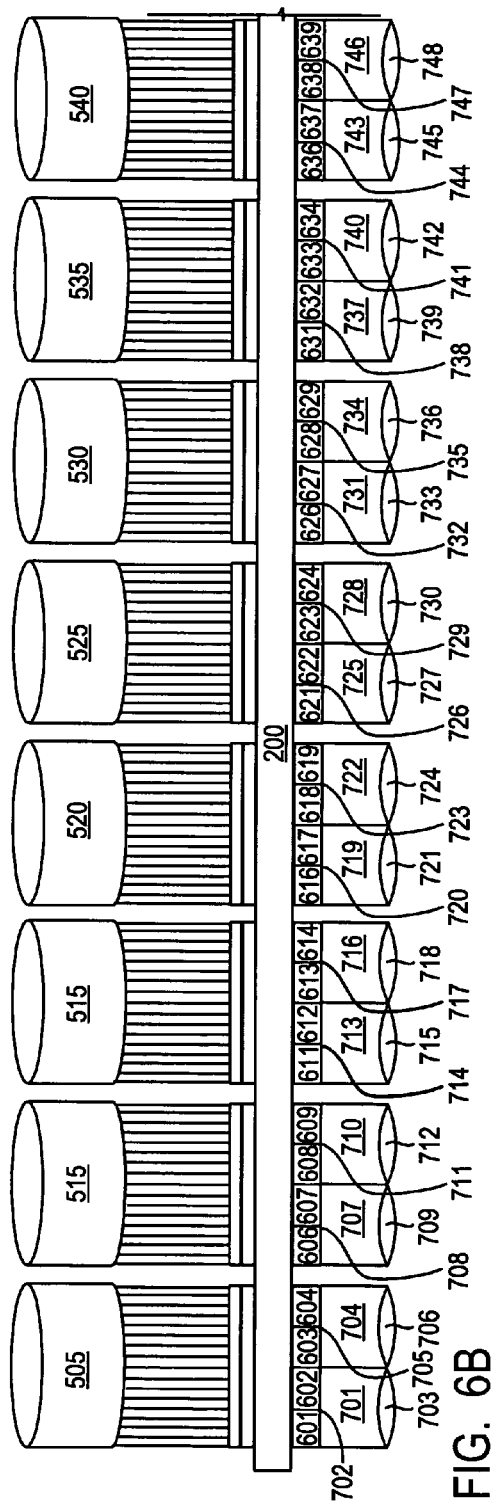
FIG. 6B, which includes
Figure 6C:
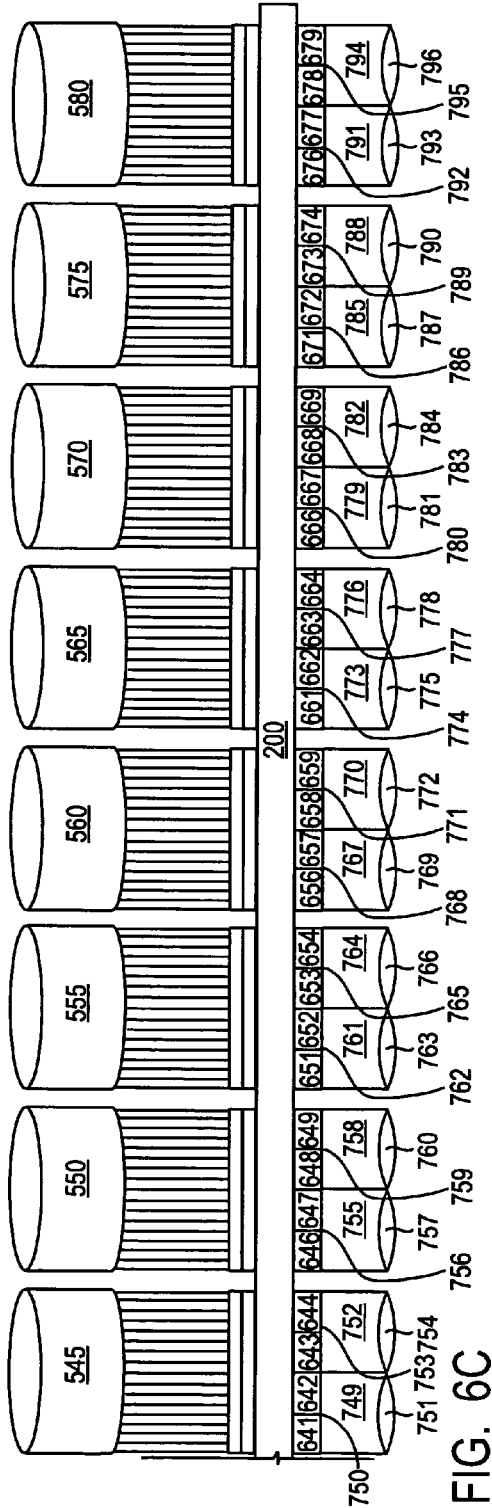

Referring now to FIGS. 6B and 6C, light pipes 704, 707, 710, 713, 716, 719, 722, 725, 728, 731, 734, 737, 740, 743, 746, 749, 752, 755, 758, 761, 764, 767, 770, 773, 776, 779, 782, 785, 788, 791, and 794, comprise first ends 705, 708, 711, 714, 717, 720, 723, 726, 729, 732, 735, 738, 741, 744, 747, 750, 753, 756, 759, 762, 765, 768, 771, 774, 777, 780, 783, 786, 789, 792, and 795, respectively, wherein that first end is disposed on light emitting surfaces of LEDs 603 and 604, 606 and 607, 608 and 609, 611 and 612, 613 and 614, 616 and 617, 618 and 619, 621 and 622, 623 and 624, 626 and 627, 628 and 629, 631 and 632, 633 and 634, 636 and 637, 638 and 639, 641 and 642, 643 and 644, 646 and 647, 648 and 649, 651 and 652, 653 and 654, 656 and 657, 658 and 659, 661 and 662, 663 and 664, 666 and 667, 668 and 669, 671 and 672, 673 and 674, 676 and 677, and 678 and 679, respectively, and wherein the light emitted by those LEDs is transmitted to second ends 706, 709, 712, 715, 718, 721, 724, 727, 730, 733, 736, 739, 742, 745, 748, 751, 754, 757, 760, 763, 766, 769, 772, 775, 778, 781, 784, 787, 790, 793, and 796, respectively.

In certain embodiments of Applicants' information storage and retrieval system, a backplane, such as backplane 200, and the data storage devices interconnected with that backplane, are disposed within an enclosure disposed in Applicants' system. For example and referring now to FIG. 7, enclosure 800 comprises exterior surface 810, and defines an enclosed space 830. Backplane 200 and data storage devices 505, 510, 515, 520, 525, 530, 535, 540, 545, 550, 555, 560, 565, 570, 575, and 580, are disposed within enclosed space 830.

Figure 7:
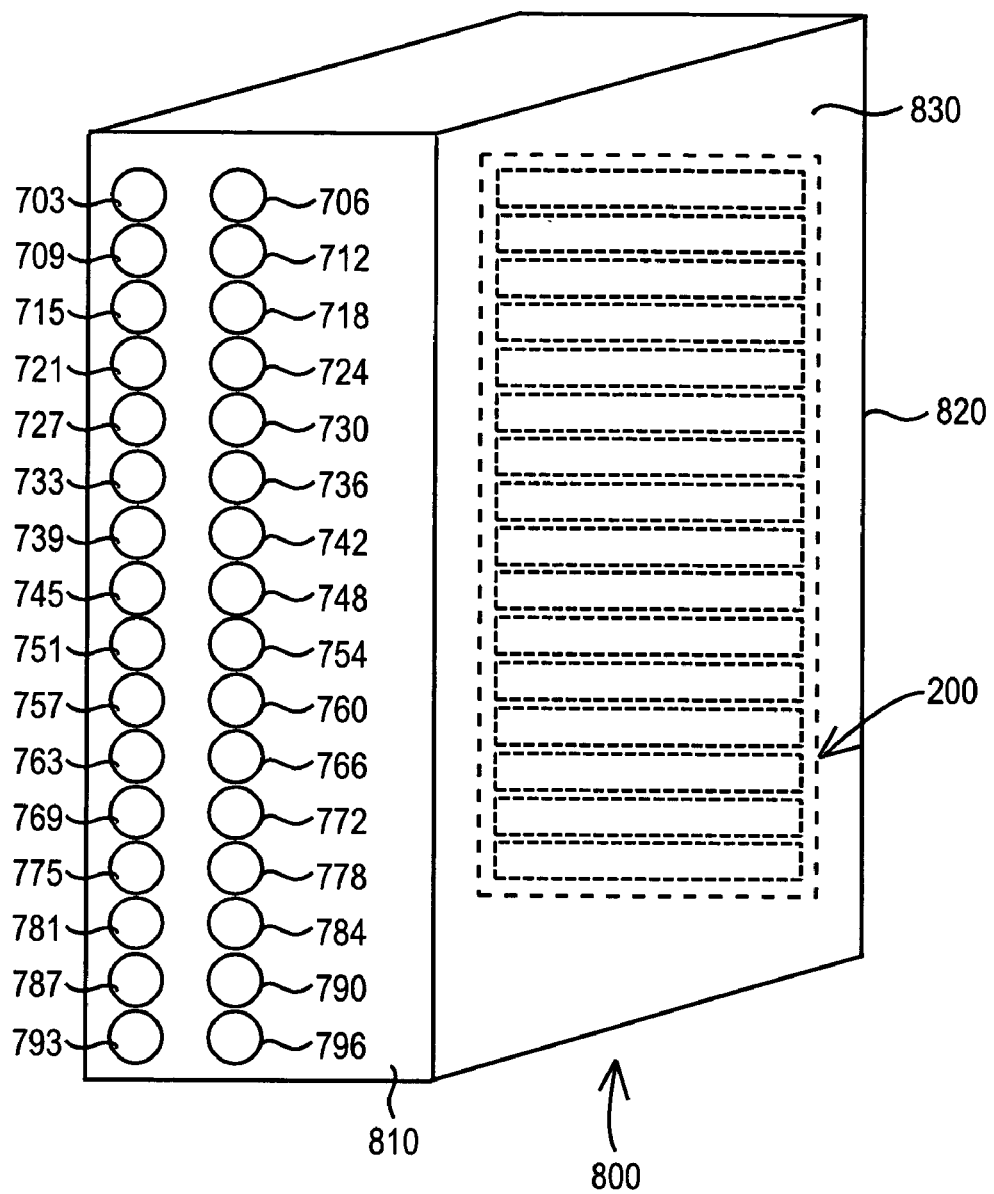
FIG. 7 is a block diagram showing an enclosure housing the assembly of FIG. 6.

In the illustrated embodiment of FIG. 7, second ends 703, 706, 709, 712, 715, 718, 721, 724, 727, 730, 733, 736, 739, 742, 745, 748, 751, 754, 757, 760, 763, 766, 769, 772, 775, 778, 781, 784, 787, 790, 793, and 796, of light pipes 701, 704, 707, 710, 713, 716, 719, 722, 725, 728, 731, 734, 737, 740, 743, 746, 749, 752, 755, 758, 761, 764, 767, 770, 773, 776, 779, 782, 785, 788, 791, and 794, respectively, are disposed on exterior surface 810, and visually display the light emitted by LEDs 601 and 602, 603 and 604, 606 and 607, 608 and 609, 611 and 612, 613 and 614, 616 and 617, 618 and 619, 621 and 622, 623 and 624, 626 and 627, 628 and 629, 631 and 632, 633 and 634, 636 and 637, 638 and 639, 641 and 642, 643 and 644, 646 and 647, 648 and 649, 651 and 652, 653 and 654, 656 and 657, 658 and 659, 661 and 662, 663 and 664, 666 and 667, 668 and 669, 671 and 672, 673 and 674, 676 and 677, and 678 and 679, respectively.

In embodiments, wherein LEDs 601 and 602 emit a yellow color, and in the event data storage device 505 detects an internal failure, then data storage device 505 causes LEDs 601 and 602 to emit yellow light, and those combined yellow-colored emissions are transmitted by light pipe 701 to second end 703 disposed on exterior surface 810 of enclosure 800 wherein those combined yellow-colored emissions are visually displayed. Similarly, the light emitted by any of the above-described LED pairs is transmitted by the interconnected light pipe to the second end of that light pipe disposed on surface 810 and visually displayed.

Figure 11:
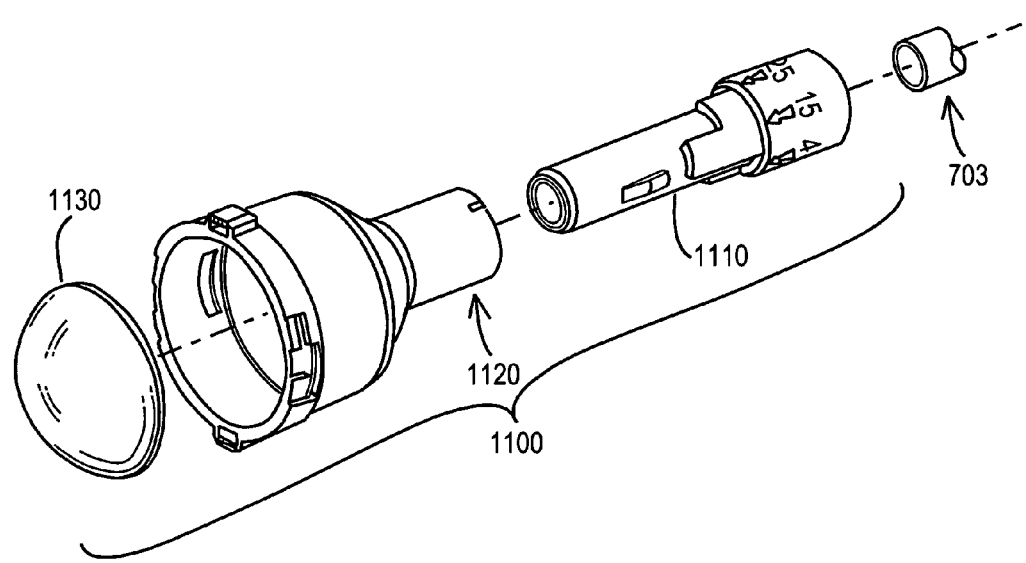
FIG. 11 is a perspective view of a lens assembly disposed on the distal ends of the light pipes of FIG. 6.

In certain embodiments, a lens assembly is disposed on the second end of each light pipe disposed on surface 810. Referring now to FIG. 11, second end 703 of light pipe 701 is received into bayonet assembly 1110 and secured in such assembly by an adhesive. Bayonet assembly 1110 is inserted into receiver assembly 1120, which holds a lens 1130. In certain embodiments, lens 1130 comprises a plano-convex lens, an aspherical lens, a holographic lens, a Fresnel lens or a flat lens, made from either glass or plastic. In certain embodiments, receiver assembly 1120 comprises Acrylonitrile Butadiene Styrene (ABS). In certain embodiments, receiver assembly 1120 is "platable" in that it can accept such coatings as chrome or brass, for reflective purposes.

Figure 12A:
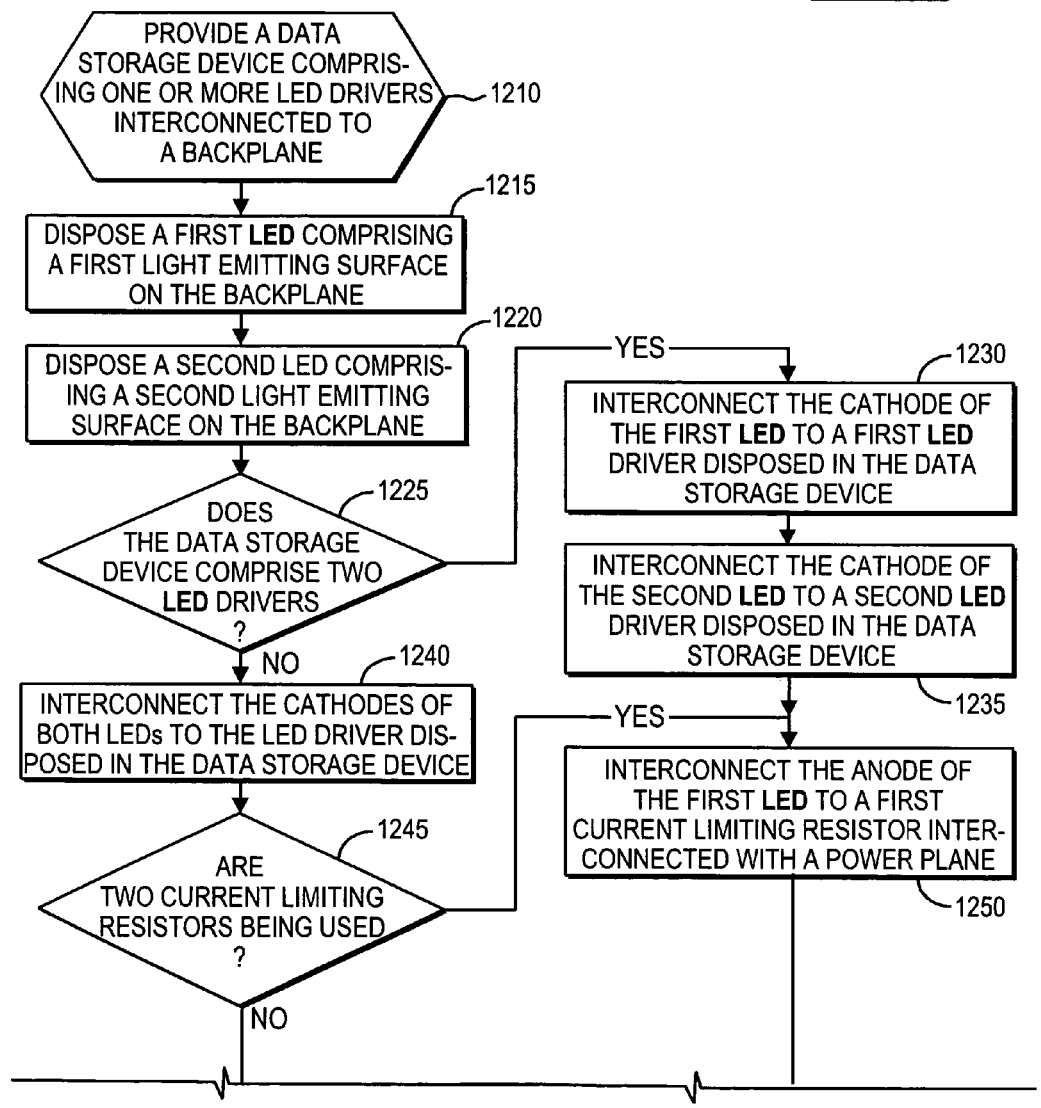
FIG.12A and 12B, is a flow chart summarizing additional steps of Applicants' method.
Figure 12B:
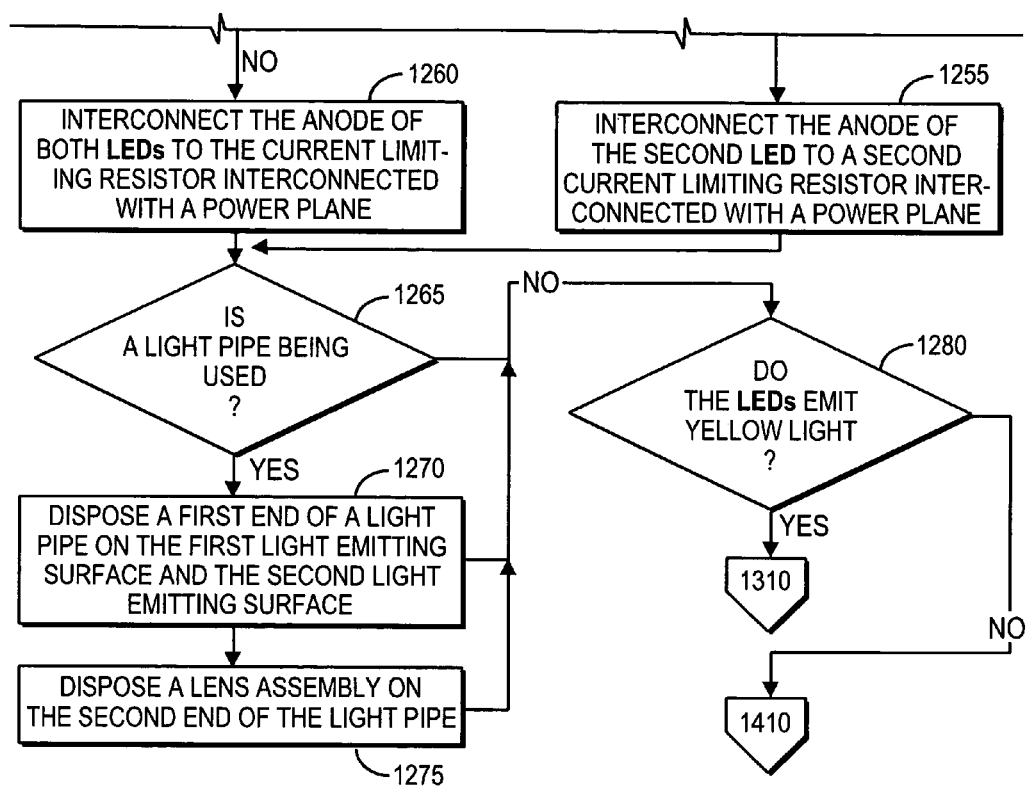

Applicants' invention comprises a method to visually indicate the status of a data storage device. Referring now to FIG. 12, in step 1210 Applicants' method provides a data storage device, such as data storage device 505, comprising one or more LED drivers, such as LED drivers 810 (FIG. 8) and 830 (FIG. 8), where that data storage device is interconnected to a backplane, such as backplane 200, disposed in Applicants' information storage and retrieval system, such as system 100. In certain embodiments, Applicants' backplane comprises one or more SCA receptacles, and Applicants' data storage device is interconnected with an SCA connector, wherein that SCA connector can be releaseably attached to an SCA receptacle disposed on the backplane.

In step 1215, Applicants' method disposes a first LED, such as LED 601, on the backplane, where that first LED comprises a first light emitting surface, such as light emitting surface 697. In step 1220, Applicants' method disposes a second LED, such as LED 602, on the backplane, where that second LED comprises a second light emitting surface, such as light emitting surface 698.

In step 1225, Applicants' method determines if the data storage device provided in step 1210 comprises an LED driver for each interconnected LED. If Applicants' method determines in step 1225 that the data storage device does not comprise an LED driver for each interconnected LED, then the method transitions from step 1225 to step 1240 wherein the method interconnects the cathodes of both the first LED and the second LED to an LED driver disposed in the data storage device.

Applicants' method transitions from step 1240 to step 1245 wherein the method determines if a separate current limiting resistor will be used for each LED interconnected with the data storage device. If Applicants' method determines in step 1245 that a separate current limiting resistor will not be used for each interconnected LED, then the method transitions from step 1245 to step 1260 wherein the method provides a current limiting resistor and interconnects that current limiting resistor interconnected with a power plane disposed in Applicants' information storage and retrieval system and with the anodes of both the first LED and the second LED. Applicants' method transitions from step 1260 to step 1265.

If Applicants' method determines in step 1245 that a separate current limiting resistor will be used for each LED interconnected with the data storage device, then the method transitions from step 1245 to step 1250 wherein the method provides a first current limiting resistor and interconnects that first current limiting resistor to a power plane disposed in Applicants' information storage and retrieval system, and to the anode of the first LED.

Applicants' method transitions from step 1250 to step 1255 wherein the method provides a second current limiting resistor and interconnects that second current limiting resistor to a power plane disposed in Applicants' information storage and retrieval system, and to the anode of the second LED. In certain embodiments, the first current limiting resistor and the second current limiting resistor comprise substantially the same resistance. Applicants' method transitions from step 1255 to step 1265.

If Applicants' method determines in step 1225 that the data storage device comprises a different LED driver for each interconnected LED, then the method transitions from step 1225 to step 1230 wherein the method interconnects the cathode of the first LED to a first LED driver. Applicants' method transitions from step 1230 to step 1235 wherein the method interconnects the cathode of the second LED to a second LED driver. Applicants' method transitions from step 1235 to step 1250 and continues as described herein.

In step 1265, Applicants' method determines if a light pipe is used to transmit light from said first LED and said second LED to a different location in Applicants' information storage and retrieval system. If Applicants' method determines that a light pipe is used, then the method transitions from step 1265 to step 1270 wherein the method provides a light pipe having a first end and a second end, and disposes the first end of that light pipe on a light emitting surface of the first LED, and on a light emitting surface of the second LED. In certain embodiments, Applicants' method transitions from step 1270 to step 1280. In other embodiments, Applicants' method transitions from step 1270 to step 1275 wherein the method provides a lens assembly, such as the lens assembly 1100 (FIG. 11), and attaches that lens assembly on the second end of the light pipe of step 1270. Applicants' method transitions from step 1275 to step 1280 wherein the method determines if the first LED and the second LED are capable of emitting yellow light. If Applicants' method determines in step 1280 that the first LED and the second LED are capable of emitting yellow light, then the method transitions from step 1280 to step 1310. Alternatively, if Applicants' method determines in step 1280 that the first LED and the second LED are not capable of emitting yellow light, then the method transitions from step 1280 to step 1410.

Figure 13:
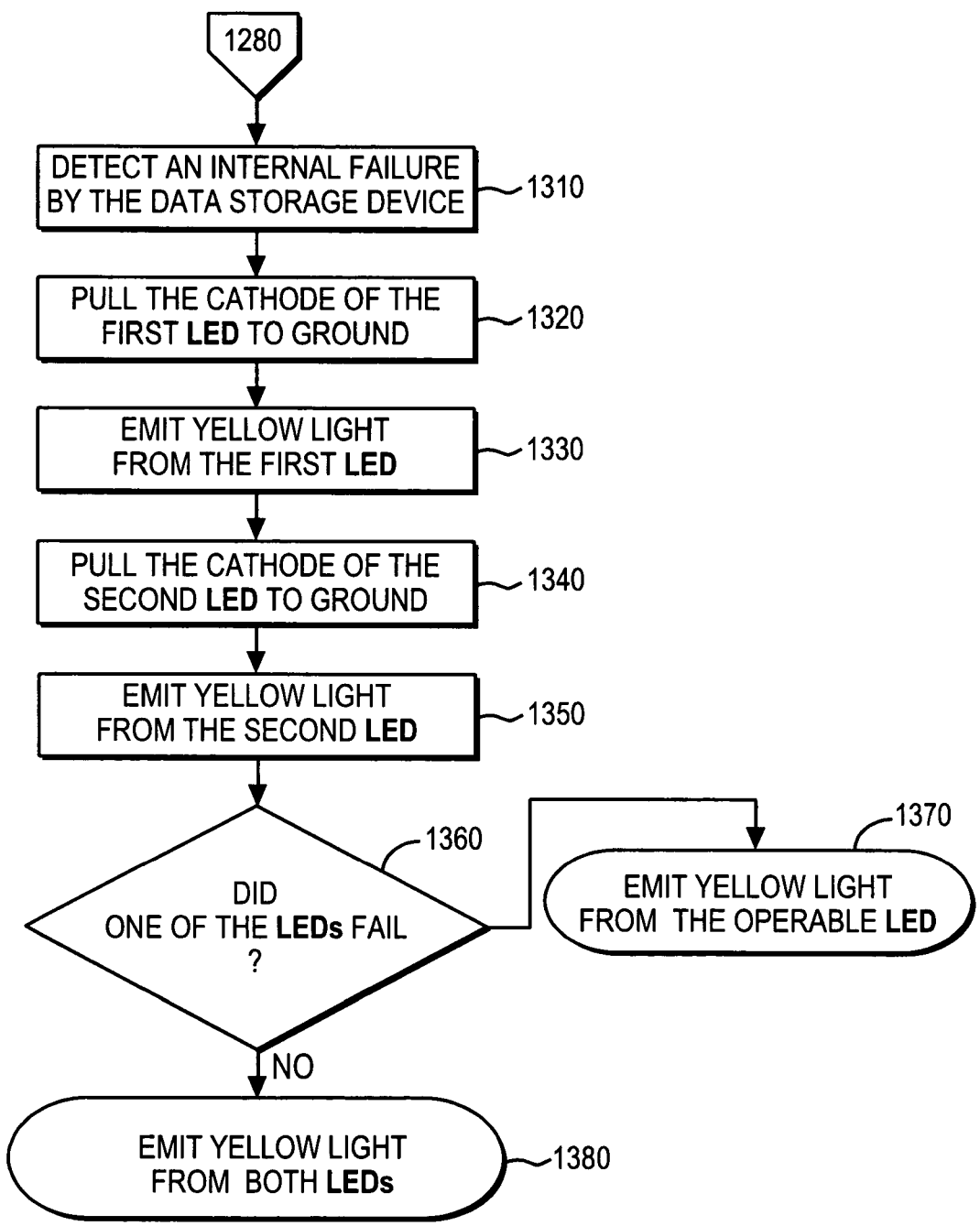
FIG. 13 is a flow chart summarizing additional steps of a first embodiment of Applicant's method.

Referring now to FIG. 13, in step 1310 Applicants' data storage device detects an internal failure. Applicants' method transitions from step 1310 to step 1320 wherein Applicants' data storage device pulls the cathode of the first LED to ground. Applicants' method transitions from step 1320 to step 1330 wherein the first LED emits yellow light.

Applicants' method transitions from step 1330 to step 1340 wherein Applicants' data storage device pulls the cathode of the second LED to ground. Applicants' method transitions from step 1340 to step 1350 wherein the second LED emits yellow light.

Applicants' method transitions from step 1350 to step 1360 wherein the method determines if one of the two LEDs failed. If either the first LED, or the second LED, fails, then Applicants' method transitions from step 1360 to step 1370 wherein the operable LED emits yellow light. Alternatively, if neither the first LED, nor the second LED, fails, then Applicants' method transitions from step 1360 to step 1380 wherein both LEDs emit yellow light.

Figure 14:
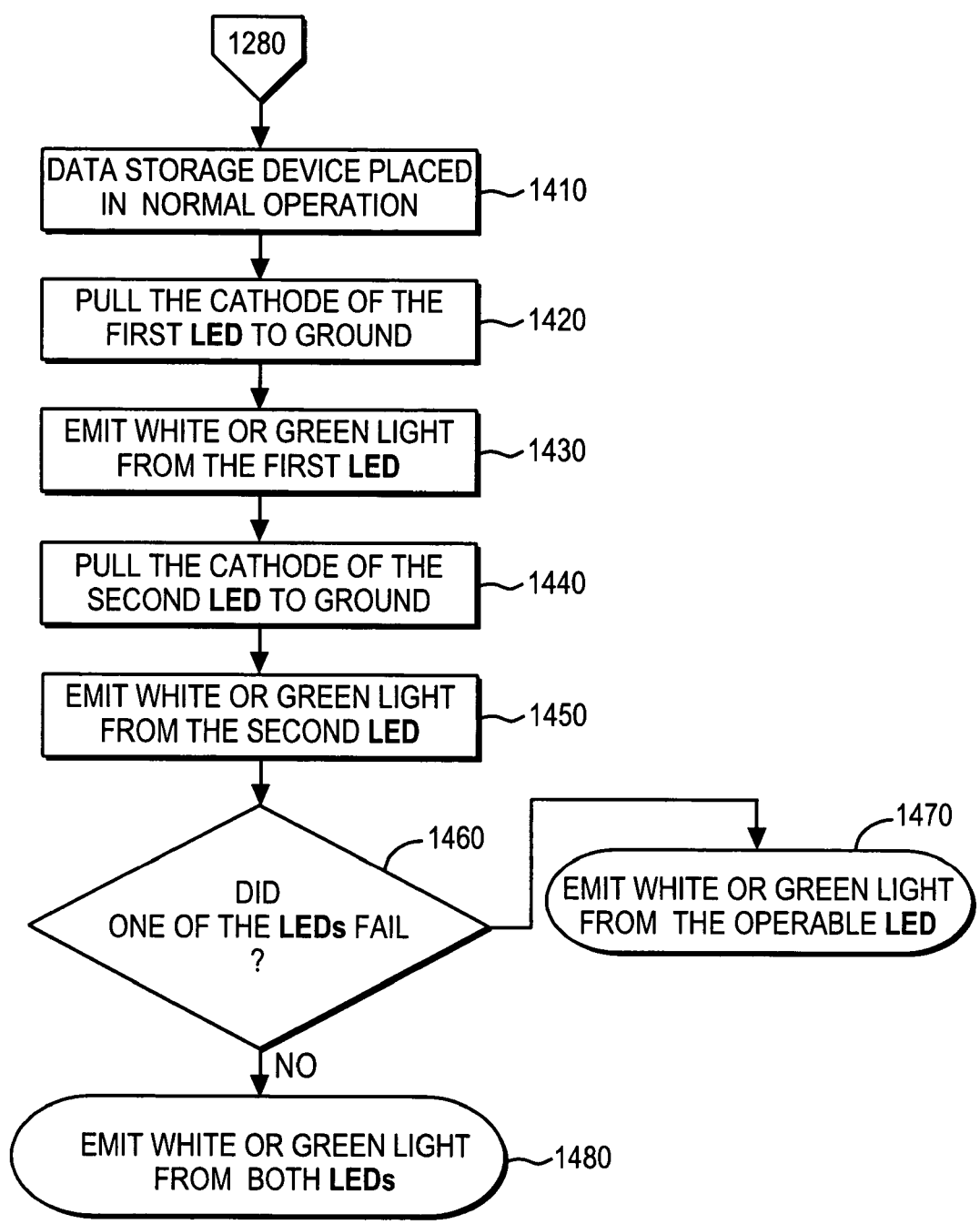
FIG. 14 is a flow chart summarizing additional steps of a second embodiment of Applicants' method.

Referring now to FIG. 14, in step 1410 Applicants' data storage device remains operative. Applicants' method transitions from step 1410 to step 1420 wherein Applicants' data storage device pulls the cathode of the first LED to ground. Applicants' method transitions from step 1420 to step 1430 wherein the first LED emits either white or green light.

Applicants' method transitions from step 1430 to step 1440 wherein Applicants' data storage device pulls the cathode of the second LED to ground. Applicants' method transitions from step 1440 to step 1450 wherein the second LED emits either white or green light.

Applicants' method transitions from step 1450 to step 1460 wherein the method determines if one of the two LEDs failed. If either the first LED, or the second LED, fails, then Applicants' method transitions from step 1460 to step 1470 wherein the operable LED emits either white or green light. Alternatively, if neither the first LED, nor the second LED, fails, then Applicants' method transitions from step 1460 to step 1480 wherein both LEDs emit either white or green light.

An information storage and retrieval system which utilizes Applicants' apparatus and method comprises an enhanced mean time between failure ("MTBF") in comparison to an information storage and retrieval system using prior art apparatus and methods. A storage services provider utilizing an information storage and retrieval system which comprises such an enhanced MTBF achieved by implementing, inter alia, Applicants' method recited in FIGS. 12, 13, and/or 14, is able to provide cost-effective information storage services to one or more storage services customers.

The embodiments of Applicants' method recited in FIGS. 12, 13, and/or 14, may be implemented separately. Moreover, in certain embodiments, individual steps recited in FIGS. 12, 13, and/or 14, may be combined, eliminated, or reordered.

While the preferred embodiments of the present invention have been illustrated in detail, it should be apparent that modifications and adaptations to those embodiments may occur to one skilled in the art without departing from the scope of the present invention as set forth in the following claims.

We claim:

1. A data storage and retrieval system, comprising:
    a data storage device;
    a first LED interconnected with said data storage device, wherein said first LED is capable of emitting first light comprising a first color;
    a second LED interconnected with said data storage device, wherein said second LED is capable of emitting said first light;
    a third LED interconnected with said data storage device, wherein said third LED is capable of emitting second light comprising a second color;
    a fourth LED interconnected with said data storage device, wherein said fourth LED is capable of emitting said second light;
    wherein said data storage device causes said first LED and said second LED to emit said first light if said data storage device detects an internal failure; and
    wherein said storage device causes said third LED and said fourth LED to emit said second light if said data storage device is operative.

2. The data storage and retrieval system of claim 1, further comprising:
    a backplane interconnected with said data storage device;
    wherein said first LED, said second LED, said third LED, and said fourth LED, are disposed on said backplane.

3. The information storage and retrieval system of claim 1, wherein:
    said first LED further comprises a first light emitting surface;
    said second LED further comprises a second light emitting surface;
    said third LED further comprises a third light emitting surface;
    said fourth LED further comprises a fourth light emitting surface;
    further comprising:
    a first light pipe having a first end and a second end, wherein said first end of said first light pipe is disposed on said first light emitting surface and on said second light emitting surface; and
    a second light pipe having a first end and a second end, wherein said first end of said second light pipe is disposed on said third light emitting surface and on said fourth light emitting surface.

4. The information storage and retrieval system of claim 3, further comprising an enclosure comprising an exterior surface, wherein said data storage device and said backplane are disposed in said enclosure, and wherein said second end of said first light pipe is disposed on said exterior surface, and wherein said second end of said second light pipe is disposed on said exterior surface.

5. The information storage and retrieval system of claim 4, further comprising:
    a first lens assembly disposed on said second end of said first light pipe; and
    a second lens assembly disposed on said second end of said second light pipe.

6. The information storage and retrieval system of claim 2, further comprising:
    a connector selected from the group consisting of an SCA connector, an S-ATA connector, and a SAS connector, interconnected with said data storage device;
    a receptacle, selected from the group consisting of an SCA receptacle, an S-ATA receptacle, and a SAS receptacle, disposed on said backplane;
    wherein said connector can be releaseably connected to said receptacle.

7. The information storage and retrieval system of claim 6, wherein said connector comprises a 40 position SCA connector.

8. The information storage and retrieval system of claim 6, wherein said connector comprises an 80 position SCA connector.

9. The information storage and retrieval system of claim 6, further comprising one or more additional information storage devices releaseably attached to said backplane, wherein said data storage device can be disconnected from said backplane without disrupting the operation of said additional information storage devices.

10. The information storage and retrieval system of claim 1, wherein:
    said first LED further comprises a first cathode and a first anode;
    said second LED further comprises a second cathode and a second anode;
    said third LED further comprises a third cathode and a third anode;
    said fourth LED further comprises a fourth cathode and a fourth anode;
    further comprising:
    a system power plane;
    a first LED driver disposed in said data storage device, wherein said first LED driver is interconnected with said first cathode;
    a first current limiting resistor interconnected with said power plane and said first anode;
    a second LED driver disposed in said data storage device, wherein said second LED driver is interconnected with said second cathode;
    a second current limiting resistor interconnected with said power plane and said second anode;
    a third LED driver disposed in said data storage device, wherein said third LED driver is interconnected with said third cathode;
    a third current limiting resistor interconnected with said power plane and said third anode; and
    a fourth LED driver disposed in said data storage device, wherein said fourth LED driver is interconnected with said fourth cathode;
    a fourth current limiting resistor interconnected with said power plane and said fourth anode.

11. The information storage and retrieval system of claim 1, wherein:

said first LED further comprises a first cathode and a first anode;
said second LED further comprises a second cathode and a second anode;
said third LED further comprises a third cathode and a third anode;
said fourth LED further comprises a fourth cathode and a fourth anode;
further comprising:
a system power plane;
a first LED driver disposed in said data storage device, wherein said first LED driver is interconnected with said first cathode and with said second cathode;
a first current limiting resistor interconnected with said power plane and said first anode;
a second current limiting resistor interconnected with said power plane and said second anode;
a second LED driver disposed in said data storage device, wherein said second LED driver is interconnected with said third cathode and with said fourth cathode;
a third current limiting resistor interconnected with said power plane and said third anode; and
a fourth current limiting resistor interconnected with said power plane and said fourth anode.

12. The information storage and retrieval system of claim 1, wherein:
said first LED further comprises a first cathode and a first anode;
said second LED further comprises a second cathode and a second anode;
said third LED further comprises a third cathode and a third anode;
said fourth LED further comprises a fourth cathode and a fourth anode;
further comprising:
a system power plane;
a first LED driver disposed in said data storage device, wherein said first LED driver is interconnected with said first cathode and with said second cathode;
a first current limiting resistor interconnected with said power plane and with both said first anode and said second anode;
a second LED driver disposed in said data storage device, wherein said second LED driver is interconnected with said third cathode and with said fourth cathode;
a second current limiting resistor interconnected with said power plane and with both said third anode and said fourth anode.

13. A method to visually display the status of a data storage device, comprising the steps of:
providing a data storage device;
providing a first LED capable of emitting first tight comprising a first color;
providing a second LED capable of emitting said first light;
interconnecting said first LED and said second LED with said data storage device;
emitting first light from said first LED and from said second LED to indicate whether said data storage device is operational;
said first LED further comprises a first light emitting surface, and said second LED further comprises a second light emitting surface;
said method further comprising the step of:
providing a light pipe comprising a first end and a second end;
disposing said first end of said light pipe on said first light emitting surface and on said second light emitting surface;
transmitting said first light from said first LED and from said second LED to said second end of said light pipe.

14. The method of claim 13, further comprising the steps of:
providing a lens assembly;
disposing said lens assembly on said second end of said light pipe; and
displaying said first tight from said lens assembly.

15. The method of claim 14, further comprising the steps of:
providing an enclosure comprising an exterior surface;
disposing said data storage device and said backplane in said enclosure;
disposing said lens assembly on said exterior surface.

16. A method to provide information storage services, comprising the steps of:
providing data storage services to one or more storage services customers using an information storage and retrieval system comprising:
a data storage device;
a first LED interconnected with said data storage device, wherein said first LED is capable of emitting first light comprising a first color;
a second LED interconnected with said data storage device, wherein said second LED is capable of emitting said first light;
a third LED interconnected with said data storage device, wherein said third LED is capable of emitting second light comprising a second color;
a fourth LED interconnected with said data storage device, wherein said fourth LED is capable of emitting said second light;
wherein said data storage device causes said first LED and said second LED to emit said first light if said data storage device detects an internal failure; and
wherein said storage device causes said third LED and said fourth LED to emit said second light if said data storage device is operative.

17. The method of claim 16, wherein said information storage and retrieval system further comprises:
a backplane interconnected with said data storage device;
wherein said first LED, said second LED, said third LED, and said fourth LED, are disposed on said backplane.

18. The method of claim 16, wherein:
said first LED further comprises a first Light emitting surface; said second LED further comprises a second light emitting surface;
said third LED further comprises a third light emitting surface;
said fourth LED further comprises a fourth light emitting surface;
wherein said information storage and retrieval system further comprises:
a first light pipe having a first end and a second end, wherein said first end of said first light pipe is disposed on said first light emitting surface and on said second light emitting surface; and
a second light pipe having a first end and a second end, wherein said first end of said second light pipe is disposed on said third light emitting surface and on said fourth light emitting surface.

19. The method of claim 16, wherein said information storage and retrieval system further comprises an enclosure comprising an exterior surface, wherein said data storage device and said backplane are disposed in said enclosure, and wherein said second end of said first light pipe is disposed on said exterior surface, and wherein said second end of said second light pipe is disposed on said exterior surface.

20. The method of claim 16, wherein said information storage and retrieval system further comprises:

a first lens assembly disposed on said second end of said first light pipe; and a second lens assembly disposed on said second end of said second light pipe.

* * * * *